Figure 1:
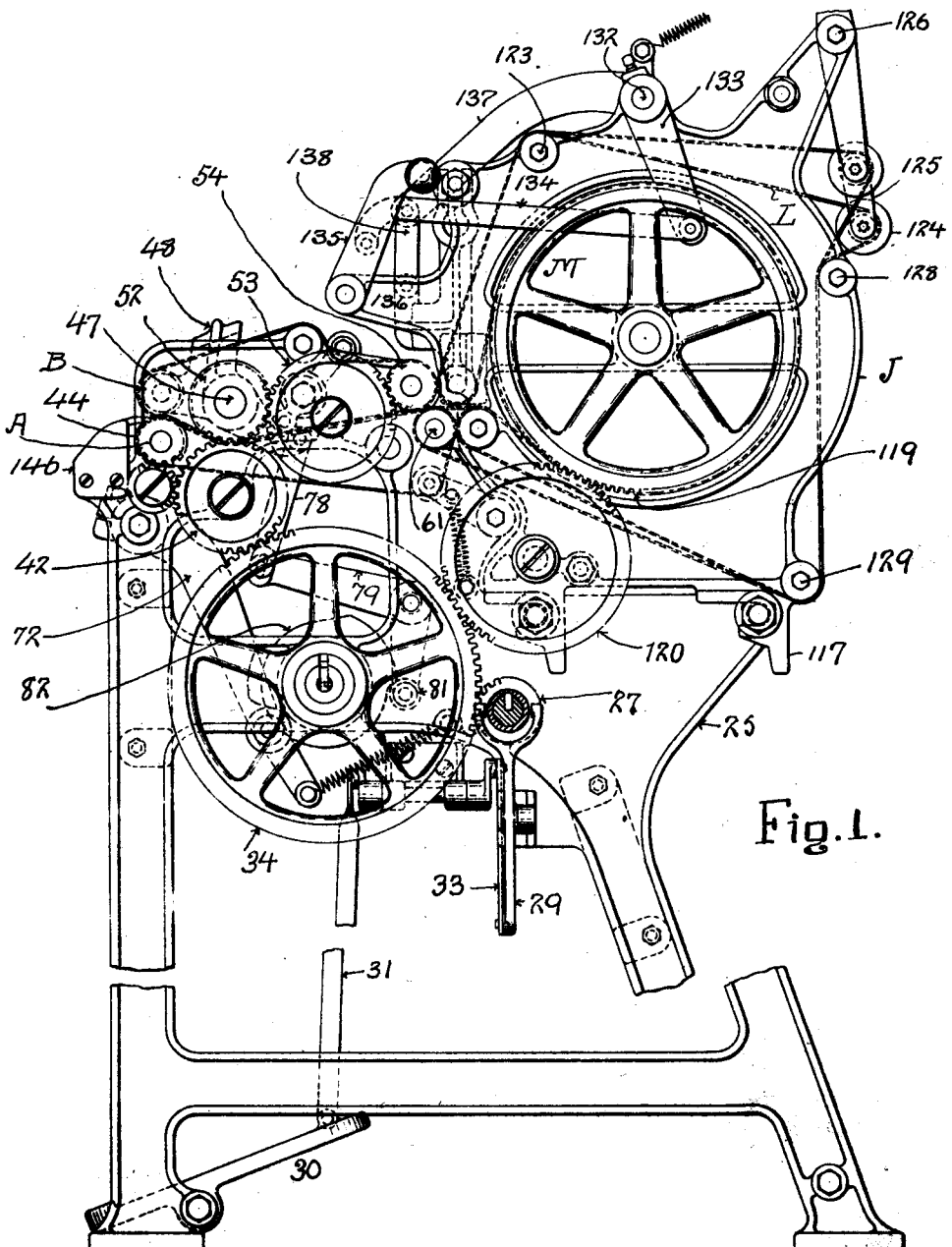

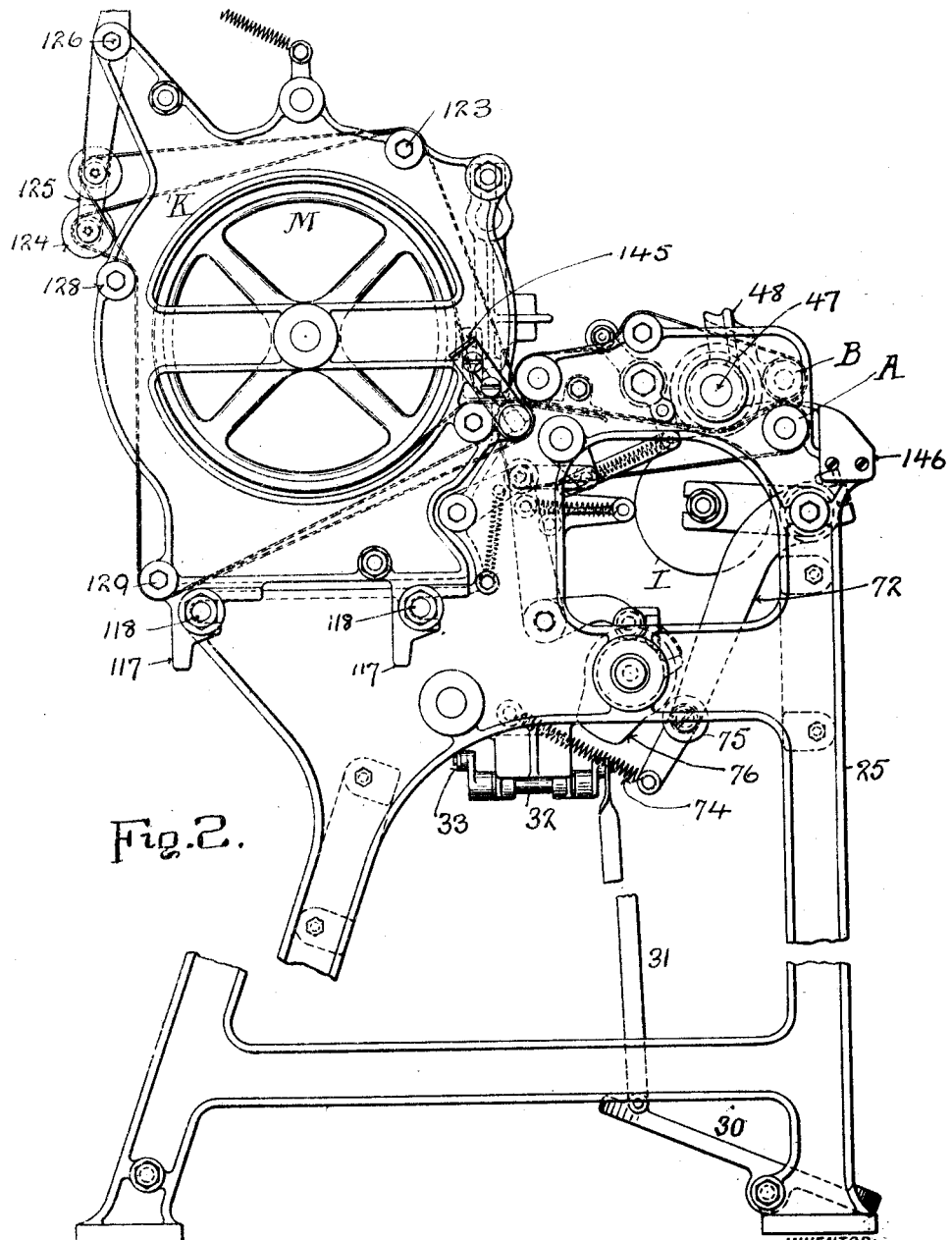

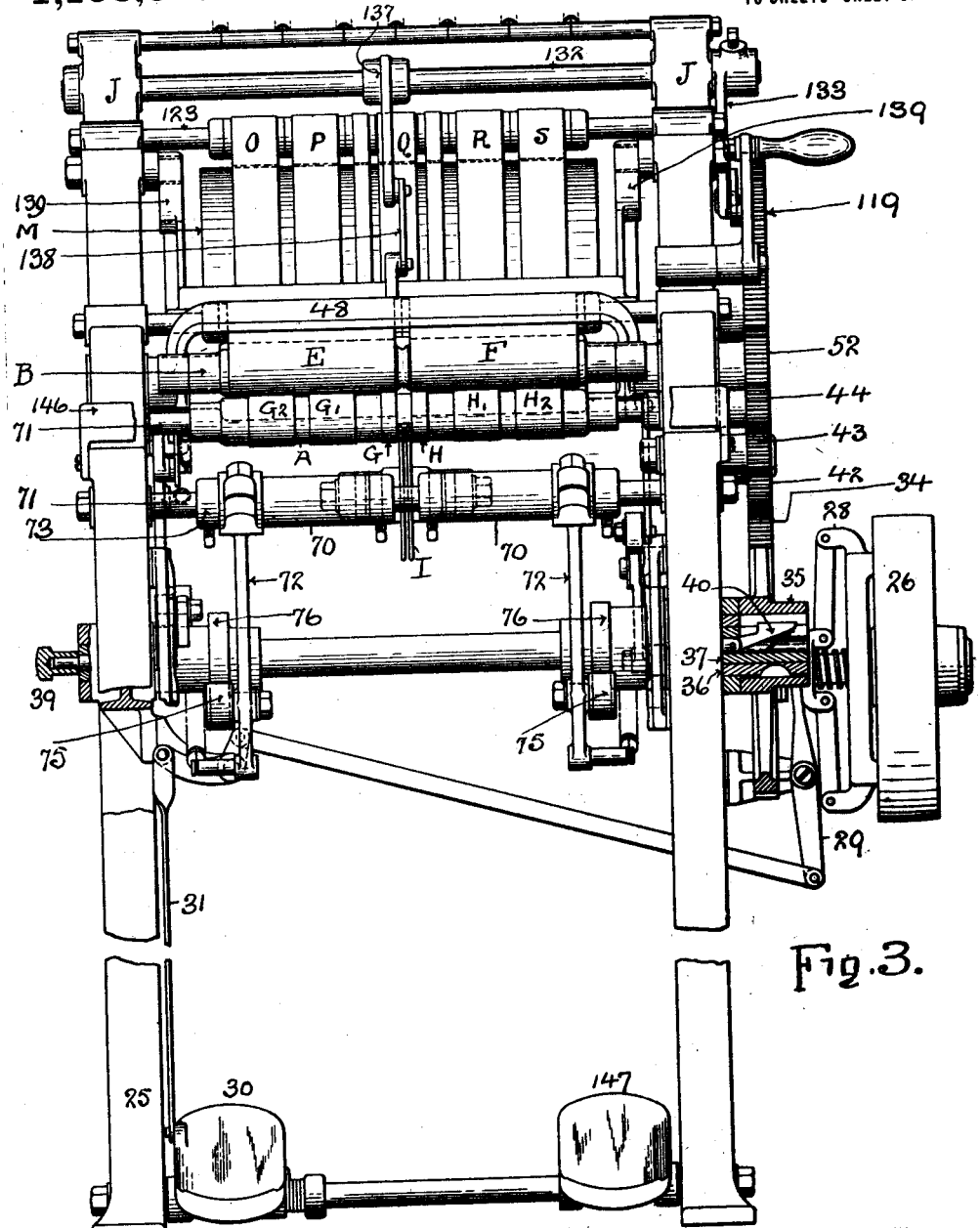

G. H. JACKSON & C. P. DAY.
MACHINE FOR STRIPPING AND BOOKING TOBACCO LEAVES.
APPLICATION FILED FEB. 1, 1915.
1,198,847.
Patented Sept. 19, 1916.
10 SHEETS—SHEET 4.
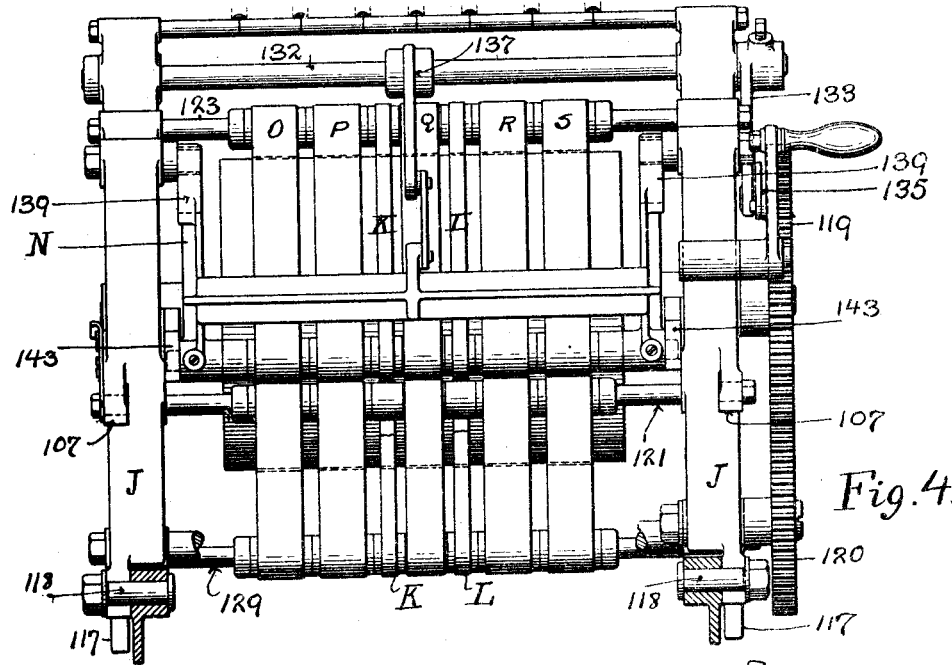
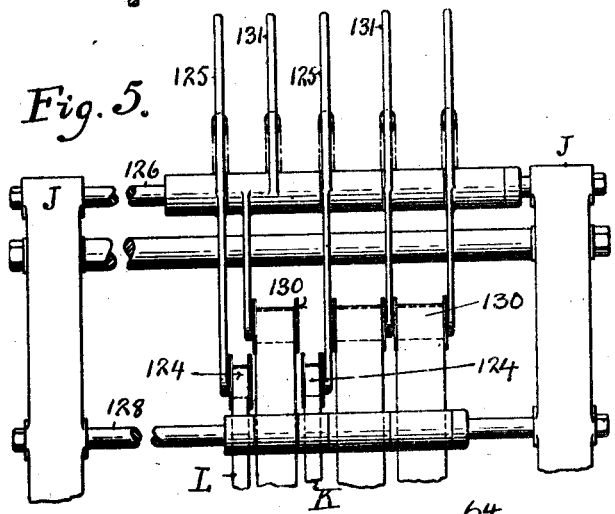
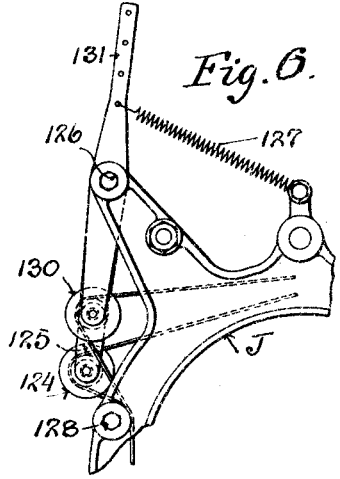
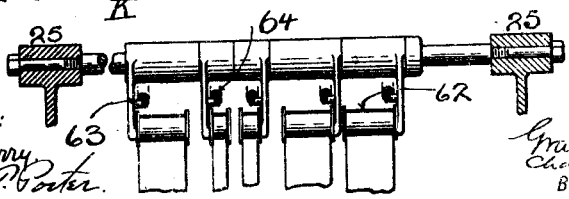
WITNESSES:
INVENTORS
Graham H. Jackson
Charles P. Day
BY
THEIR ATTORNEY

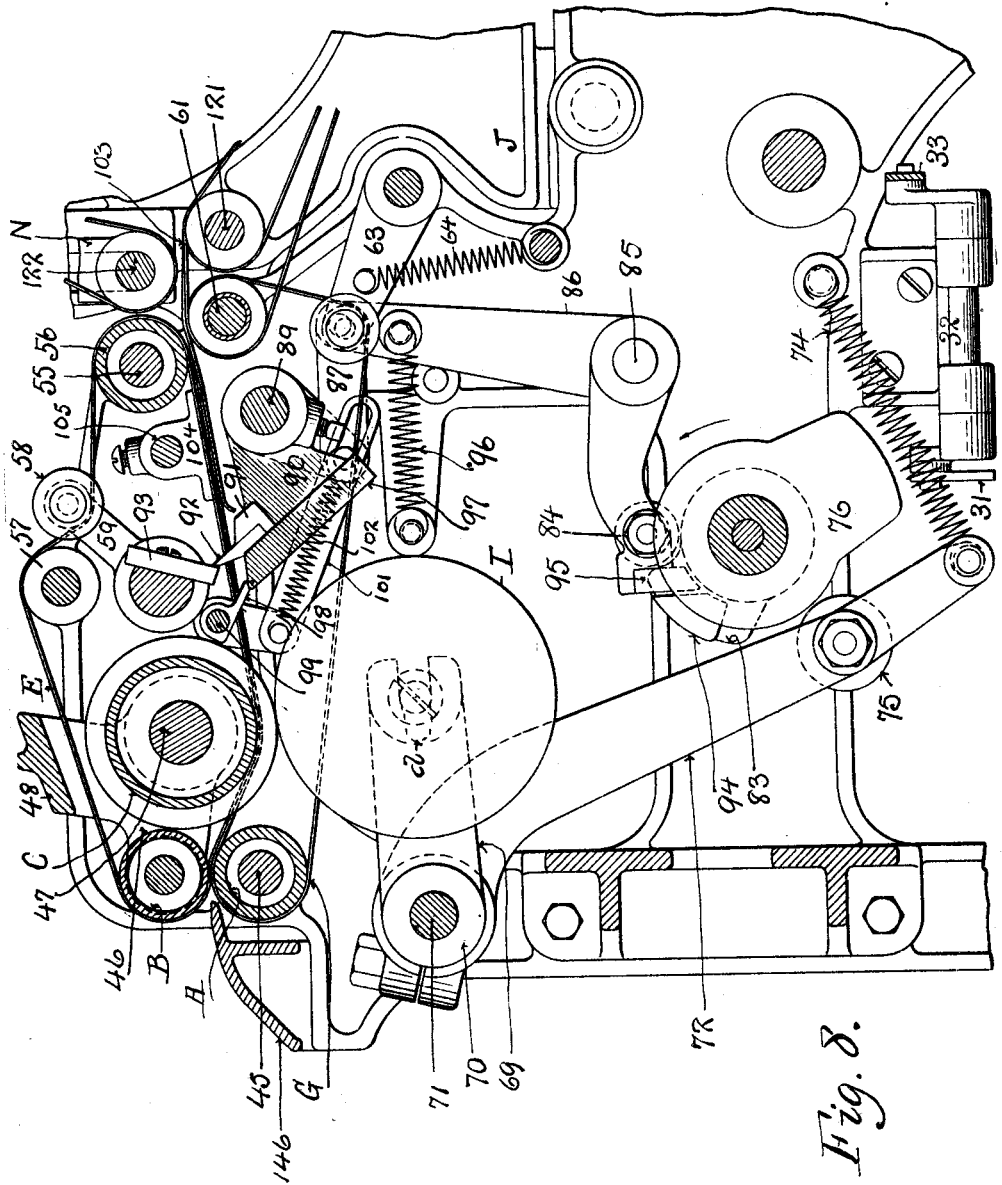

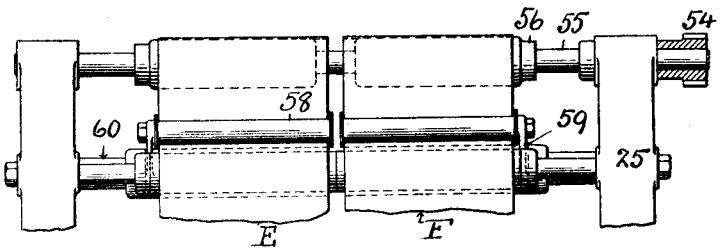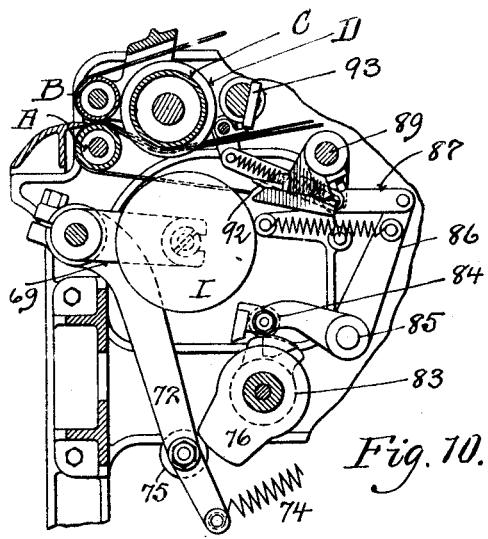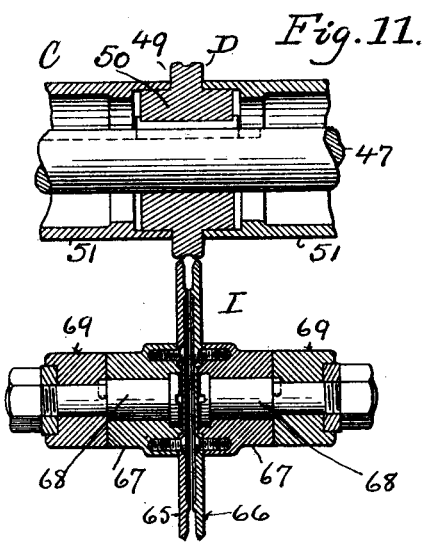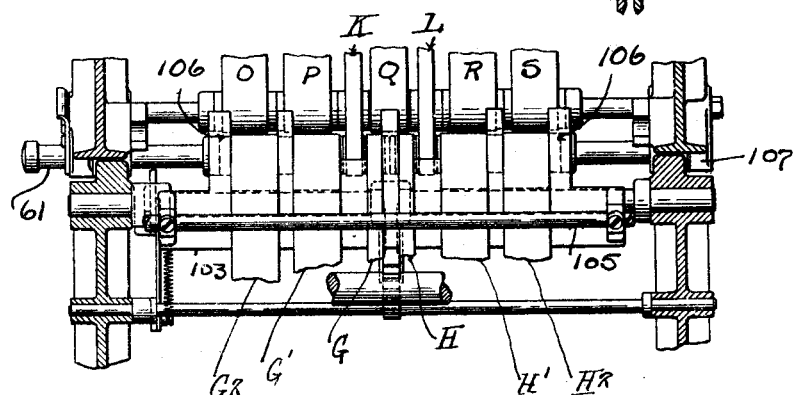

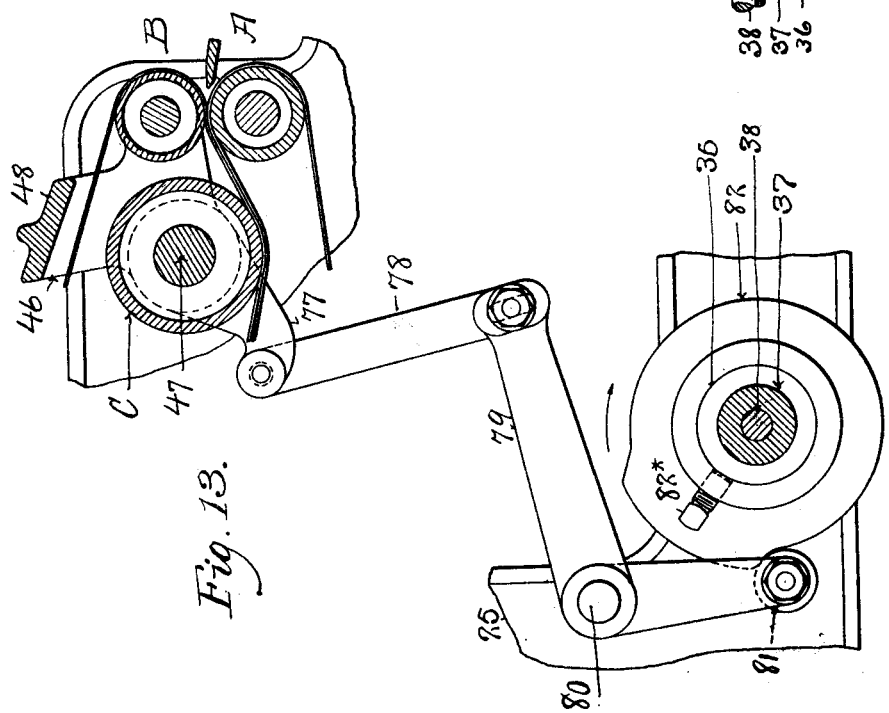

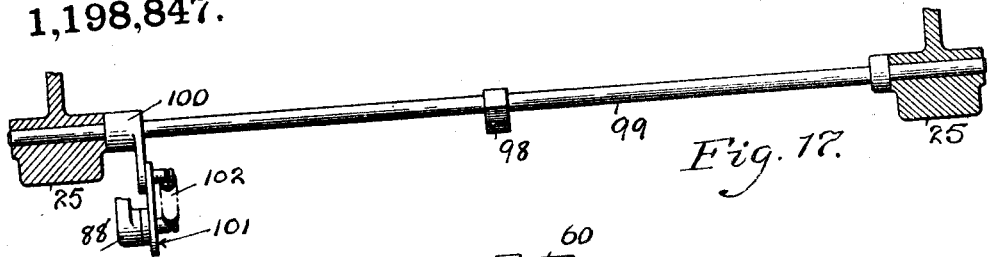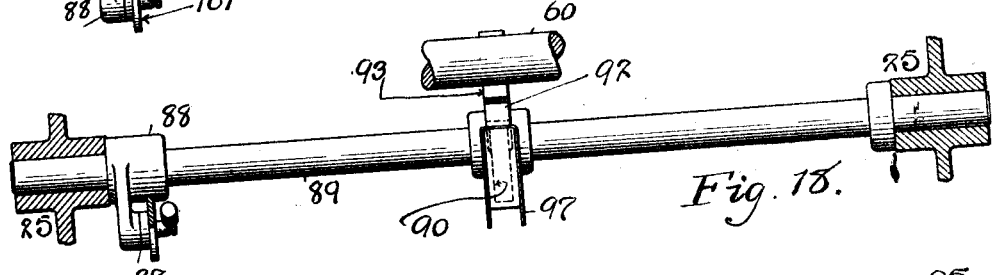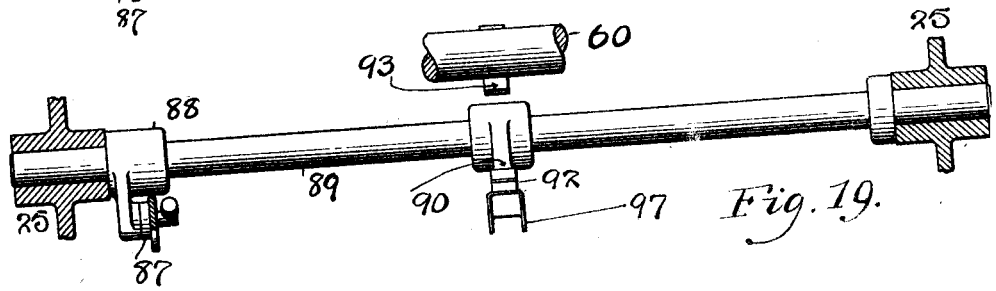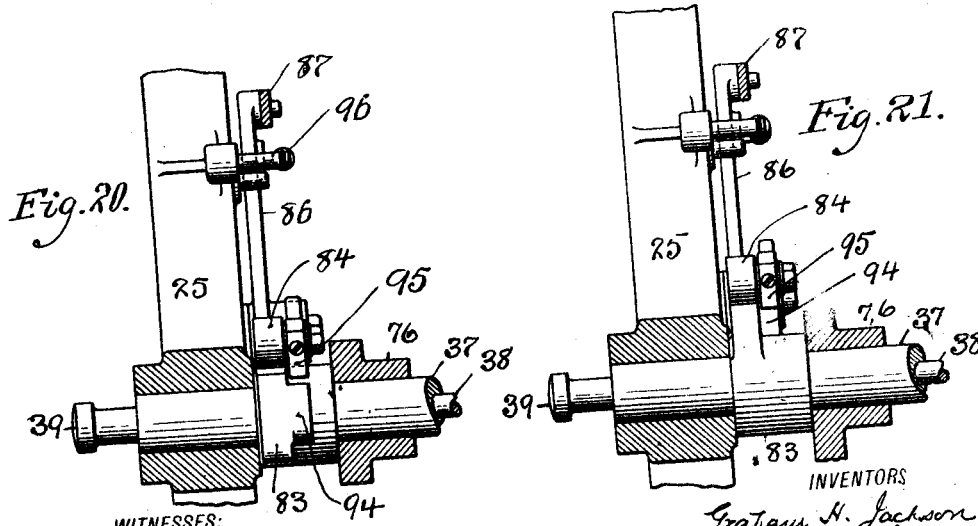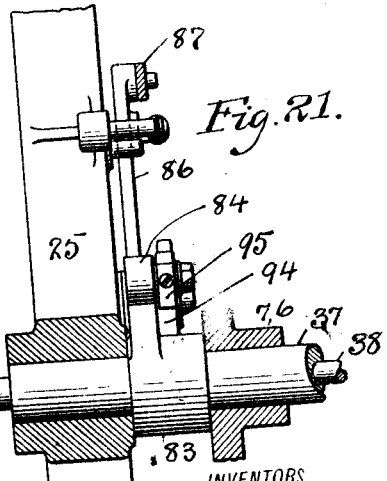

UNITED STATES PATENT OFFICE.

GRAHAM H. JACKSON AND CHARLES P. DAY, OF NEWARK, NEW JERSEY, ASSIGNORS TO UNIVERSAL TOBACCO MACHINE CO., A CORPORATION OF NEW YORK.

MACHINE FOR STRIPPING AND BOOKING TOBACCO-LEAVES.

1,198,847.   Specification of Letters Patent.   Patented Sept. 19, 1916.

Application filed February 1, 1915.   Serial No. 5,466.

*To all whom it may concern:*

Be it known that we, GRAHAM H. JACKSON and CHARLES P. DAY, citizens of the United States, residing at Newark, in the county of Essex and State of New Jersey, have invented a certain new and useful Improvement in Machines for Stripping and Booking Tobacco-Leaves, of which the following is a specification.

The invention is a machine for stripping and booking tobacco leaves.

The objects of this invention are to provide a stripping machine comprising means for laterally stretching the elastic membrane or wing portions of the leaf, while said leaf is supported for the cutting operation, whereby the amount of membrane left adherent to the stem is reduced. The said means permit of a predetermined maximum stretching strain being applied and of adjustment of strain within the limit thus determined. Also comprising means for stripping the entire stem or a fractional portion thereof from the leaf, as may be desired. In this way, the thin thread-like end portion of the stem may be left adherent to the wing portions. In some classes of tobacco leaf this part of the stem may remain without impairing the value of the leaf. The construction is such that the length of the stripping cut may be varied as desired. Also comprising means for transversely dividing the stem to free the same at the end of the cut, and for ejecting the cut off portion from the machine at such time and in such a way as will prevent said free portion from becoming engaged in the mechanism. Also comprising means for feeding the leaf to the stripping mechanism, automatically operating to intermit the feed in order to enable the attendant to introduce the leaf in proper timing with the stripping mechanism. Also comprising a novel construction of the rotary cutter, which comprises two rotary cutting disks independently supported so that either may be removed for sharpening or substitution. Also comprising a novel construction of the rotary cylinder for supporting the leaf to be stripped, the said cylinder having an encircling flange, with the circumferential surface of which flange the cutter coöperates. Also comprising means for holding the leaf upon the stripping cylinder and for conveying the stripped leaf therefrom to the mechanism for transversely cutting the stem and then to the booking devices. Also comprising means for transferring the leaves from said conveying means to the rotary booking drum. Also comprising means for permitting the operator to remove the booked leaves from the drum, which means when in closed or running position is locked in place.

The invention further includes many novel combinations, whereby an improved and cheapened construction and greater facility of adjustment of the various mechanisms are obtained, the same being more particularly pointed out in the claims.

Figure 15:
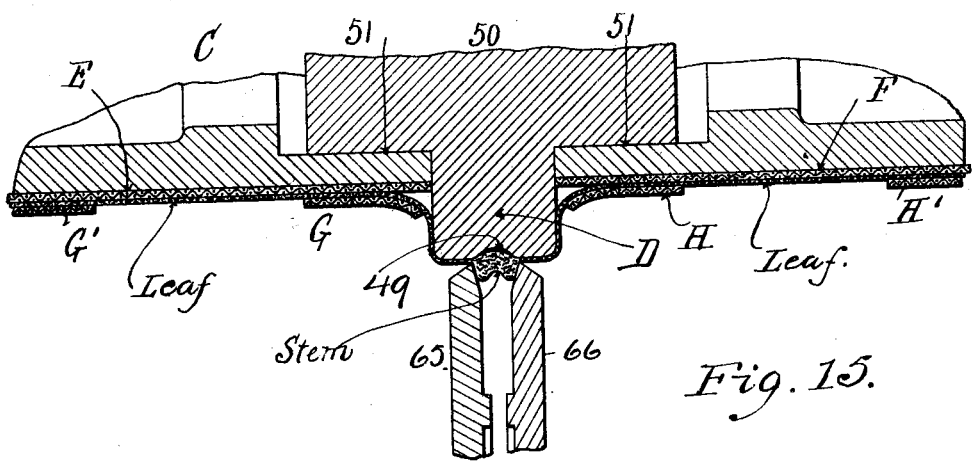
Figure 16:
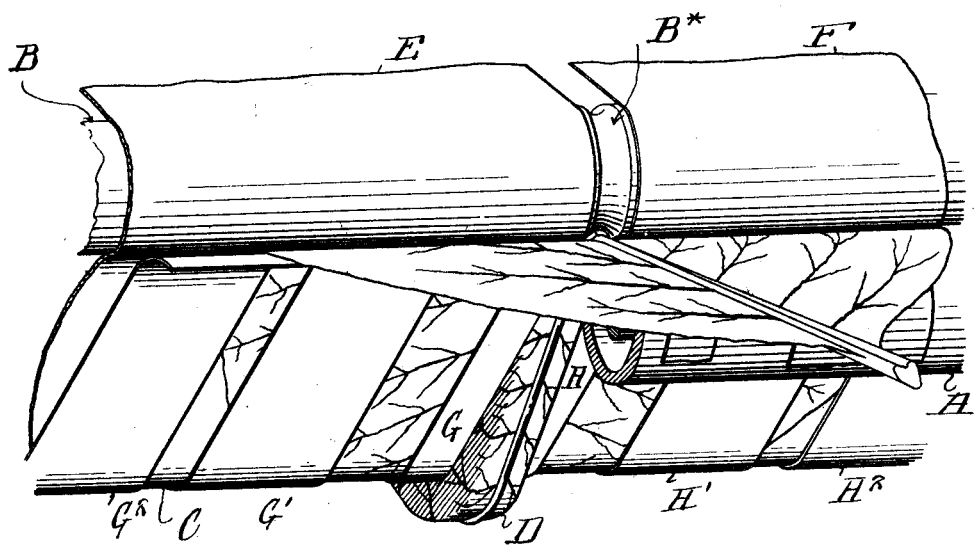
Figure 22:
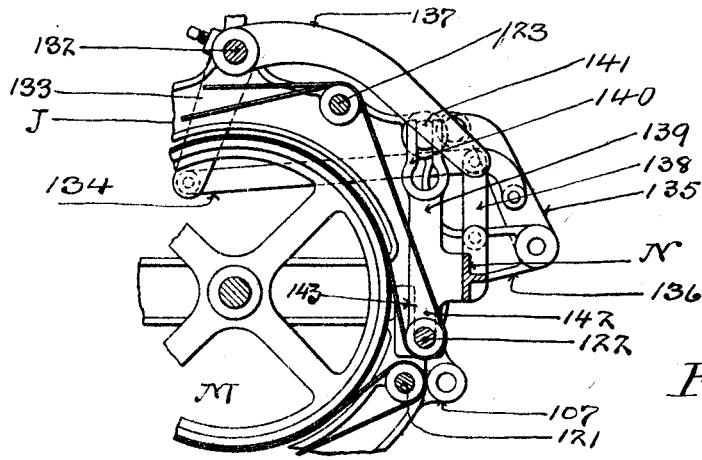
Figure 23:
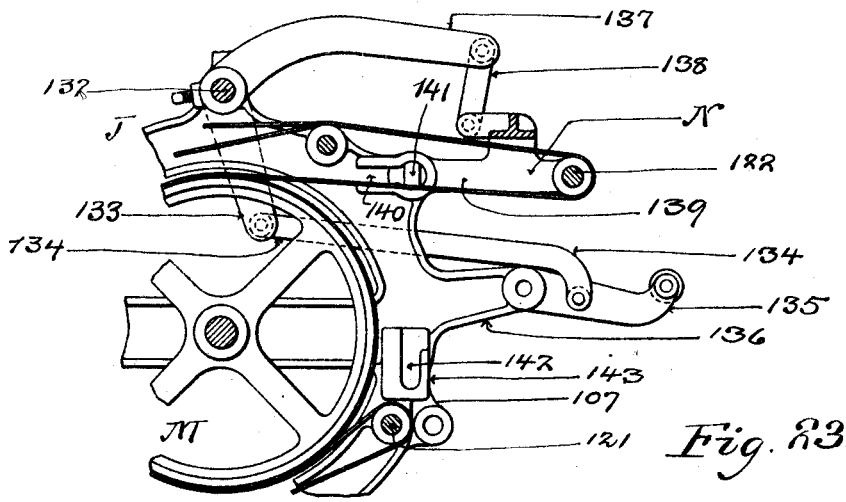
Figure 24:
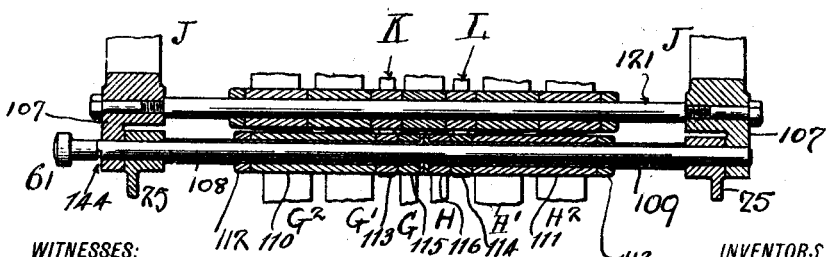

In the accompanying drawings—Figure 1 is an elevation of the right hand side of the machine. Fig. 2 is an elevation of the left hand side. Fig. 3 is a front elevation, with the device for controlling the operation of cam shaft 37 in section. Fig. 4 is a front elevation of the booking mechanism. Fig. 5 is a partial rear elevation of the booking mechanism, showing the belt tightening rolls. Fig. 6 is a partial left hand side elevation of a part of the booking frame carrying the belt tightening rolls. Fig. 7 is a top view of certain of the tightening rolls 62 and their supporting arms 63. Fig. 8 is an enlarged central vertical section of the stripping mechanism, showing also a portion of the booking mechanism in proximity thereto. In Fig. 8 the cutter I is shown in operating position. Fig. 9 is a top view of the shaft 55 and the tightening rolls 58. Fig. 10 is a sectional view similar to Fig. 8, but on a smaller scale, showing the cutter I lowered out of operating position. Fig. 11 is a longitudinal section through the cutter I and the cylinder C, the end portions of the cylinder C and its shaft 17 being broken away. Fig. 12 is a top view of the rear end of the stripping mechanism showing more particularly the supporting plate 103 and its fingers 106 in their relations to the belts G, H and K, L. Fig. 13 is a detailed view showing on a larger scale the mechanism for lifting the feed roll B. Fig. 14 is a longitudinal section of the mechanism for connecting the shaft 37 with the tubular shaft 36. Fig. 15 is a longitudinal section of a portion of the cylinder C taken through the flange D and showing the upper portion of the cutter I in its relations to the flange D and to the leaf here shown in place during the stretching and cutting of the leaf from the stem. Fig. 16 is a perspective view of the upper feed roll B, lower feed roll A and the cylinder C, showing the leaf in position as engaged by the belts on said rolls and cylinder. Fig. 17 is a front elevation of the shaft 99 carrying the clearing finger 98 for the stem. Fig. 18 is a front elevation of the shaft 89 and a portion of the shaft 60, showing the cutter knife 92 in engagement with the cutting block 93 to divide the stem transversely. Fig. 19 is a similar view to Fig. 18, showing the knife 92 in lowered position. Fig. 20 is a front view, showing the cam 76 and a portion of the frame 25 in section, and also exhibiting the knife moving lever 86 and cam 83 for operating the same, and showing these parts with the knife in its upper or cutting position. Fig. 21 is a similar view to Fig. 20, showing the position of the parts when the knife is in the lowered position, and hence out of action. Figs. 22 and 23 are sectional elevations showing certain of the roll shafts in section and illustrating the means for permitting removal of the booked leaves from the booking drum. In Fig. 22 is shown the position of this device while the booking is going on. In Fig. 23 is shown the position of this device when the bracket N is lifted to permit of the booked leaves being taken from the machine. Fig. 24 is a vertical section taken through the rolls on shafts 121 and 61, and illustrating the construction of said rolls and the relations of the various belts thereto.

Similar letters and numbers of reference indicate like parts.

*General features.*—This machine comprises: 1. Mechanism for stripping the leaf so as to remove either the whole or only a portion of the length of the stem. 2. Mechanism coacting with the stripping mechanism and the booking mechanism for taking the stripped leaves from the stripping mechanism and delivering them to the booking mechanism. 3. Mechanism for booking the stripped leaves. Certain principal parts of these mechanisms which will be described in detail hereafter may be conveniently distinguished at the outset.

The feed rolls A, B, by which the leaf is drawn into the machine, are disposed one above the other. The upper feed roll B carries the endless belts E, F and the lower feed roll A two groups of endless belts G, G', G² and H, H', H², these belts being elsewhere suitably supported and driven. All of the belts pass under the stripping cylinder C and hold the leaf thereon during the stripping operation. While the leaf is on the cylinder, it is acted upon by a rotary cutter I which has two circumferentially sharpened disks coöperating with the circumferential surface of a flange D encircling cylinder C, to produce two parallel cuts on opposite sides of the stem. The separated stem is ejected from the machine. The wing portions of the leaf are carried onward by the belts, and finally pass upon two belts K, L, by which they are transferred to the booking drum M which is journaled in a separate frame J which is secured upon the main frame of the machine. A swinging bracket N on frame J, which carries one of the supporting rolls for the booking belts on said drum, permits of removal of the books therefrom.

*The driving mechanism.*—The driving mechanism is supported on the side frames 25, which are connected by the usual tie-rods. The driving pulley 26 is supported on a shaft which is journaled in frames 25 and carries a pinion 27, Fig. 1. Between said pulley and said shaft is interposed any suitable clutch mechanism 28, Fig. 3, operated by the usual pivoted yoked lever 29, Figs. 1 and 3. Said lever is actuated to bring the clutch into and out of engagement by means of the foot treadle 30, Figs. 1, 2, 3. Said treadle is connected by a pitman 31 to a crank arm on a shaft 32 supported in brackets from the frame, on the opposite end of which shaft is another crank arm which is connected to lever 29 by a link 33, Fig. 3.

The pinion 27 on the driving pulley shaft engages with a gear 34, Fig. 1, the hub 35 of which, Figs. 3 and 14, is keyed to a short tubular shaft 36 which is journaled in the right hand side frame 25. In shaft 36 is a second tubular shaft 37 which extends across the machine and is journaled in the left hand side frame 25. In shaft 37 is a sliding rod 38 which is provided with a head 39, Figs. 2 and 3, at one end, by means of which it can be moved longitudinally in shaft 37. At its opposite end shaft 37 is recessed to receive a key 40, Fig. 14, which is pivoted to the end of rod 38, and which when the parts are in the position shown in Fig. 14, is held in engagement by means of a leaf spring 41 with its keyway in the shaft 36. When the rod 38 is drawn by the operator to the left of Fig. 14, the shoulder on the shaft 37 formed by the key recess therein pushes the key downwardly and so withdraws it from its keyway in shaft 36. It will, therefore, be understood that when the rod 38 is in one position, namely, as shown in Fig. 14, motion is transmitted from hub 35 to shaft 37, and when it is moved to release the hub 35, said motion is not transmitted from said hub to said shaft. The purpose of this construction is this: Motion is imparted from the gear 34, by means hereafter explained, both to the stripping mechanism and the booking mechanism whether shaft 37 be engaged with gear 34 or not. But if said shaft be engaged, then certain cams on said shaft bring into operation means for limiting the length of the cut made on each side of the stem measured from butt to point, and for dividing the stem when that limited length has been reached, the remainder of the stem then being left connected to the wing portions. In other words, if it is desired to remove the stem entirely from the wing portions, the gear 34 is disconnected from its shaft 37. If it is desired to leave a portion of the length of the stem still joined to the wing portions, the gear 34 is connected to said shaft 37.

*The stripping mechanism.*—We will first describe the stripping mechanism in its general operation, and then the coaction therewith of the mechanism for removing a limited portion of the stem.

The gear 34 engages with a pinion 42, Fig. 1, on a stud on one of the frames 25. Pinion 42 engages with pinion 43, also on a stud. Pinion 43 engages with pinion 44 on the end of the shaft 45, Figs. 2, 3 and 8, which is journaled in the side frames and supports the lower feed roll A. The upper feed roll B is journaled in arms extending forwardly from two plates 46, Figs. 8 and 13, which are loose upon the shaft 47 which is journaled in the side frames. These arms are connected by a cross bar 48 which may be integral with them. Fixed on the shaft 47 is a hollow cylinder C having at its middle a rib D, Figs. 11, 15, 16, in the circumferential periphery of which is a groove 49. The function of groove 49 is to guide the stem, to straighten crooked stems and to form an abutment on each side of the stem to resist the lateral stretch imparted to the wing portions of the leaf, as hereinafter more fully explained. The rib surface on each side of the groove is smooth. The rib is preferably formed upon a circular collar 50, Figs. 11, 15, which is keyed to the shaft 47. The cylinder C is of greater diameter than shaft 47 and is preferably made in two parts 51 which at their inner ends lap over the collar 50, Fig. 15, and abut against the rib D thereon. The outer ends of the sleeves may be headed and secured in any suitable way on shaft 47.

On the right hand end of shaft 47 is a pinion 52, Figs. 1 and 3, which engages pinion 42, so that the cylinder C is thus positively rotated. Pinion 52 engages with a pinion 53, Fig. 1, on a stud on the frame. Pinion 53 engages with pinion 54 on the end of shaft 55, Figs. 4 and 9, which carries two belt rolls 56. There are two sets of feed belts—an upper set which passes around the upper feed roll B, and a lower set which passes around the lower feed roll A. Taking first the upper feed belts: These are two broad endless belts E, F, Figs. 1, 2, 3, 9, 16. These belts pass from upper feed roll B, over rolls 57, Figs. 8, 9, loose on a stationary shaft extending between the frames 25, under flanged tightening rolls 58, supported on arms 59 which are loose upon a fixed transverse shaft 60, thence around rolls 56, thence under and in contact with the lower side of cylinder C, and back to feed roll B.

The lower feed belts are in two groups. Group G, G', G² is disposed below belt E, and group H, H', H² is disposed below belt F, Fig. 16. Said lower belts pass from the lower feed roll A, under the cylinder C and belts E and F, so that belts E and F are interposed between the cylinder surface and belts G, G', G² and H, H', H², over loose guide rolls on a shaft 61, Figs. 8, 24 (the construction of which rolls and shaft will be described farther on), and under flanged tightening rolls 62 carried by arms 63, loose on a fixed shaft secured in the frames 25, which arms are drawn downwardly by helical springs 64, and so back to feed roll A. The upper surfaces of the lower feed belts and the lower surfaces of the upper feed belts are in contact.

From the foregoing description it will be apparent that the upper feed belts are driven from rolls 56 on shaft 55, through the gearing 54, 53, 52, 42, interposed between said rolls and gear 34, and that the lower feed belts are driven from lower feed roll A through pinion 44 on shaft 45 of said roll and pinions 43, 42, interposed between pinion 44 and gear 34; also that the contacting portions of the belts under cylinder C move inwardly so as to draw the leaf placed between the feed rolls A, B into the machine.

The cutter I, Figs. 3, 8, 11, 15, is not positively driven. It is constructed as follows (for details see Fig. 11): Two disks 65, 66, having sharp circumferential edges, are secured to the opposite faces of hubs 67, which hubs turn freely on the shouldered portions of studs 68. Said studs are secured by nuts in forks on the ends of arms 69, Fig. 8. Said arms are formed integrally with sleeves 70, Figs. 3 and 8, carried on a fixed shaft 71 extending between the side frames. On shaft 71 and on the outer sides of sleeves 70 are two collars 73, Fig. 3, provided with clamping screws. By loosening said screws, the sleeves 70 can be adjusted nearer together or farther apart, and in this way the distance between the cutter disks 65, 66, may be regulated to vary the width between the parallel cuts made by said disks on the leaf. The cutter I is made up of two separable disks, so that either one can be removed for sharpening or repair.

The edges of cutter I coact with the smooth circumferential surface of rib D on cylinder C, on each side of the groove 49 in said rib, as shown in Fig. 15. By means of downwardly extending levers 72, Fig. 8, clamped to sleeves 70, and to the lower ends of which levers helical springs 74 are connected, said cutter is normally held with its edges in position to coöperate with said rib surfaces, and so to divide the leaf as it passes over said surfaces.

*Operation of the stripping mechanism to remove the entire stem.*—We will now describe the operation of the mechanism thus far set forth.

The leaf is introduced point foremost between the feed rolls A, B, with its stem lying in a circumferential groove B*, formed at the middle of roll B, between the belts E, F, Fig. 16. It is then engaged between the belts E, F above it and the belts G, G', G² and H, H', H² below it, and while so held passes below rib D of cylinder C, and is bent transversely over said rib, as shown in Figs. 15 and 16. The action of the belts G, H on opposite sides of said rib is to stretch laterally the elastic wing portions of the leaf on each side of the stem, which stem lies in the groove 49, as shown in Fig. 15. In this way, a greater proportion of the leaf is drawn outside of the lines of cutting made by parallel disks 65, 66, and hence after the cutting a less amount of the leaf remains adherent to the stem. The degree of stretch will depend largely upon the proximity of the innermost edges of belts G and H to the sides of the rib D, being greatest when said edges touch and wipe in a direction radial to cylinder C and inward along the rib sides and less in proportion to the distance of said edges from said rib sides. This degree may, therefore, be regulated once for all, if desired, by setting the belts G, H with respect to said rib sides, to suit the character of leaf to be stripped. To a tough leaf a greater stretching strain may be applied than to a tender leaf, and adjustment of the belts G, H with respect to their proximity to rib D will be made accordingly. In Fig. 15, we have illustrated the conditions when the edges of the belts G, H are not set in wiping contact with the sides of the rib D, but at a very short distance therefrom. Said belts are to be made of soft pliable material, such as webbing, rubber or calfskin, which will permit the inner edges of said belts to bend slightly to accommodate themselves to the leaf, as indicated in Fig. 15, and so exert an elastic wiping pressure on the leaf to effect the stretching of the leaf without tearing or cutting it, as might happen if the belts were of a material which presented edges of a hard, sharp or unyielding character. The remaining belts G', G² and H', H² of the two lower groups serve to hold the wing portions of the leaf closely against the two belts E, F, which in turn rest against the cylinder C. The belts E, F then form an elastic surface on which the leaf bears, and which, in conjunction with the two groups of belts G, G', G² and H, H', H², tightly hold the leaf and prevent any drawing in of the wing portions thereof in a lateral direction toward the rib D while the stem is being cut out in the manner now to be described.

The cutter I is set preferably with its center in rear of the central longitudinal axis of cylinder C, as illustrated in Fig. 8. Its two disks 65, 66 are separated at such a distance as that the widest part of the stem will be crowded in between them, as shown in Fig. 15. Said edges coöperate with rib D to cut the web portion of the leaf from the stem on each side thereof, as the leaf is conveyed between said rib and the cutter, the stem then lying in the groove 49 in said flange.

The object of placing the cutter somewhat in rear of the cylinder C is to permit the stretching of the leaf, above described, to be done before the cutting is effected. But it is to be especially noted that by placing the cutter at different distances from the cylinder C, we can regulate the instant of cutting so as to occur at a given period either during or after the stretching operation. Thus we can cause the cutting to begin almost immediately after the belts G, H start to stretch the leaf, or by setting the cutter rearwardly, we can delay it until a given stretch, or even until the maximum possible stretch, has been produced by the belts G and H. It will be apparent, therefore, that by this construction we control the stretching of the leaf over the rib D in two ways: first, by means of the belts G, H, which we can set nearer to or farther from the rib D, and so establish a desired maximum stretch; and second, by the described adjustment of the cutter I, we can cause the cutting to take place at any point during the stretching operation, or after the same has finished. In this way, we can regulate the amount of stretch actually applied to the leaf, within the maximum limit already established by the adjustment of the belts. We have pointed out that the belts in any given machine designed for a particular class or group of classes of tobacco may be adjusted once for all with reference to the rib D. Similarly, the position of the center of cutter I may once for all be adjusted with respect to said rib. This we can do by making the cutter-supporting arms 69 of determinate length, or we can make the cutter shafts adjustable in said arms by elongating the recesses in which said arms are clamped, as indicated in dotted lines at $a$, Fig. 8. There is still a third way of regulating the stretch imparted to the leaf, namely, by varying the tension of the belts G, H. This may be done by regulating the pull of helical springs 64, Fig. 8, upon the arms 63 which carry the tightening rolls 62, over which said belts pass. Any known means may be provided for adjusting this spring tension, or a spring of determinate tension may be inserted once for all. To sum up, therefore, we control the stretch of the leaf over rib D, by regulating the tension of belts G, H, by adjustment of springs 64, by placing said belts with their inner edges nearer to or farther from said rib, and by adjusting the cutter center so that after a maximum possible stretch has been determined by either or both of the preceding means, the cutting is effected when some predetermined degree of stretch less than the possible maximum is attained.

After the leaf has passed the cutter, the wing portions are carried on by the belts to the device for transferring them to the booking drum, and the stem falls from the machine. This completes the operation of stripping the leaf from the entire stem. We defer explanation of the transferring and booking mechanism, in order to describe the mechanism for limiting the cut to only a portion of the length of the stem measured from the butt or thick end, the remaining portion of the stem being now left attached to the leaf as it passes to the booking devices.

*The stripping mechanism for removing a portion of the stem, and its operation.*—There is a certain class of tobacco leaves in which the stem for a considerable distance from the point is small and thread-like, and in fact is not much thicker than the lateral veins which form the leaf skeleton. In preparing such leaves for use as cigar fillers, it is not customary to remove the whole of the stem, but, on the contrary, to take out only the thicker portion of the stem, which in some leaves is two-thirds to three-quarters of the whole, while in others a much shorter section of the thick portion of the stem may be taken out. In order to provide for this partial cutting of the leaf, it is necessary to move the cutter out of coöperation with rib D when the predetermined length of cut has been made, and it is also necessary to insure the insertion of the point of the leaf between the feed rolls A, B, at a certain time which bears a relation to the time when the cutter after completing its partial cut on a preceding leaf and having been withdrawn, is moved again into position ready to operate on the succeeding leaf.

The moving of the cutter into and out of operation is effected by the following mechanism. On the two downwardly extending levers 72 are mounted rollers 75, Fig. 8. On the shaft 37, Figs. 3, 8, 14, are mounted two cams 76, the toes of which, when said shaft is rotated, (by the bringing, as described of pivoted key 40 into engagement with the hub 35 of pulley 34) press said levers outwardly or to the left of Fig. 8. The cutter I is thus moved downwardly from the position shown in Fig. 8 into the position shown in Fig. 10; and hence out of coöperation with rib D. It will, of course, be obvious that we can time the operation of the cams 76 by suitably rotating them upon their supporting shaft, and then clamping them in place by the usual set screws.

The timing of the feed in relation to the movement of the cutter is effected by the following means: It has already been pointed out that the upper feed roll B is journaled in arms of two connected plates 46, Fig. 13, which plates are loose on shaft 47. On one of said plates is a rearwardly extending arm 77, Figs. 1 and 13, which is connected by a link 78 to one arm of a bell crank lever 79, pivoted to the frame at 80. The other arm of said lever has a roller 81 which coöperates with a cam 82 on shaft 36. It will be obvious that when the cam 82 rotates to force the roller 81 to the left of Fig. 13, the upper feed roll B is lifted up, so that the belts on feed rolls A and B are separated. This separation indicates the moment for the operator to insert the point of the leaf between rolls A, B. As the toe of the cam 82 passes roller 81, the feed roll B descends, and the leaf is engaged and drawn inward. The cutter I has meanwhile been held out of coöperation with rib D by the action of cams 76, until the desired length of stem (measured from the point) which is to remain in the leaf has passed. Then the levers 72 are released by said cams 76, and are moved by their springs 74 to carry the cutter up into operating position, and the cut is made from the place where said cutter begins to act to the butt of the stem. The cam 82 is secured upon its shaft 36 by a set screw 82*. By loosening this set screw, the cam 82 may be adjusted upon its shaft to regulate the moment when the feed rolls come together to grasp the leaf and draw it into the machine, and in this way we can also regulate the length of stem to be left in the leaf, since the adjustment of cam 82 varies the timing relation of the operation of the feed rolls and that of the cutter. That is to say, if we advance the operation of cam 82, then a longer amount of stem will be fed into the machine before the cutter acts, while if we retard said operation, a less amount of stem will be fed in.

Assuming now that by the means described, we have begun the cut on the leaf at some place distant from its point and have continued that cut to the butt end of the leaf, it is obvious that the stem of the leaf, although divided from the leaf at its edges, will remain whole, and it is therefore necessary to cut that stem transversely at or about the place where the longitudinal cutting operation has begun in order to detach it from the leaf. This we accomplish by the following mechanism, which will be found best shown in Figs. 8, 10, 17, 18, 19, 20 and 21: On the shaft 37 is another cam 83, Figs.

8, 10, 20 and 21, having a toe which runs under a roller 84 on one arm of a bell crank lever pivoted at 85 to the machine frame. The other arm 86 of said bell crank lever is pivoted at its upper end to a link 87, best shown in Fig. 10. The other end of said link is pivoted to an arm 88 which is fast upon a shaft 89, Figs. 18, 19, which is journaled in the side frames of the machine. On the shaft 89 is a projecting plate 90, integral with which is a block 91, which has a recess to receive the knife 92, Fig. 8. Above the knife 92 is a block 93 which is fast upon shaft 60 which, as already explained, carries the arm 59 of tightening roll 58. The block 93 is fast on shaft 60, and is set at an inclination, as shown in Fig. 8, to the plane of the knife 92, which inclination may be varied for the purpose of taking up wear by rotating the shaft 60 more or less in its bearings in the frame, and then clamping it by screws at its ends outside the frame. It will be obvious that as the cam 83 is rotated, it will oscillate the shaft 89 to cause the knife 92 to move toward and from the block 93. The stem, as will be hereafter explained, is cut between the knife 92 and the block 93, and in order to make this cutting action rapid so that it will not interfere with the forward movement of the stem, we provide the following means, (see Figs. 8, 10, 20, 21): On one side of the toe of cam 83 is a plate 94, which may be made integral with the said toe or bolted, as desired (see Figs. 8, 20, 21). The outer or working edge of this plate extends a little beyond the outer or working edge of the cam toe, as shown in Fig. 8. Formed integral with the lever arm which carries roller 84 is a projection which carries a downwardly projecting dog 95, the lower end of which is curved to conform to the curvature of the working edge of plate 94. Shortly after the roller 84 has run upon the cam toe, the dog 95 runs upon the plate 94. The relative proportions of the parts are such that the dog 95 remains upon the plate 94 for a short time after the cam toe has run under the roller 84, and then when the sharp rear end of plate 94 runs from beneath the dog 95, that dog is forced down suddenly by the action of a spiral spring 96 which is attached at one end to the lever arm 86 and at the other end to a fixed pin on the frame. The effect is to throw up the knife 92 very quickly so as to cut the stem transversely between the knife edge and the block 93.

*Removal of the divided stem.*—It is now necessary to get the cut off stem portion away from the moving parts and out of the machine. This is done by the following means: On the lower inclined edge of the knife-carrying plate 90 is an inverted trough or guide 97, both ends of which are open, and the upper end comes directly underneath the cutting point between knife 92 and block 93, Figs. 8, 18, 19, so that the cut off stem will tend normally to drop into that open end. In order to insure this dropping of the stem, we provide a finger 98 which is fast on a shaft 99, Fig. 17, pivoted at its ends in the frame. This shaft is oscillated by the following mechanism: On said shaft is a crank arm 100, Fig. 17, to the end of which is pivoted a link 101. At the end of link 101 is a slot, in which is received a pin on lever arm 87 on shaft 89. Interposed between the pin on arm 87 and the pivot pin between arm 100 and link 101 is a helical spring 102, the tendency of which is to draw these parts together. When the knife 92 is away from the cutting block 93, as shown in Fig. 10, the spring 102 is in extended position, and therefore it raises the finger 98 into contact with the bottom of the cutting block 93, as shown in Fig. 10, so that the stem in moving rearward passes under that finger. Now when the arm 86 swings forward to bring the knife 92 to its cutting position, the pin on said lever 87 travels in the slot in link 101, and therefore does not move said link forwardly until it reaches the left hand end of that slot, as shown in Fig. 8. Then the link 101 is moved forwardly, and consequently finger 98 is moved downward positively, and this occurs practically simultaneously with the cutting operation of the knife. The finger 98 then, as already stated, bearing upon the stem, which is now cut off, forces the advancing end of the cut off stem into the guide trough 97, so that said end is guided downwardly by said trough, thus permitting the whole stem to drop out of the machine, and shielding the parts beyond the stem from any movement of the stem into them.

As tobacco leaves are always more or less gummy, it is desirable to provide some means for separating the wing portions, from which the stem has now been removed, from the belts which carry said portions. For this purpose, we provide a metal plate 103, Fig. 12, which is supported at each end on brackets 104, which are clamped upon a fixed shaft 105. The fixed plate 103 extends below the belts G, H, and has a number of comb-like teeth or projections 106, Fig. 12, which extend upwardly in the intervals between the belts G, H so as to lie over the rolls on shaft 61, and at their rear ends are sharpened off thin. The advancing ends of the leaf wings run upon these teeth and by them are prevented from being carried around by said rolls which are free to turn on said shaft 61.

*Apparatus for transferring the leaf from the stripping to the booking mechanism.*— On the side frames J which support the booking mechanism, hereafter to be explained, are two downwardly projecting lugs 107 which extend over the outside of the main frames 25 and the shaft 61. It is now necessary to describe the construction of the belt roll on said shaft 61 (see Fig. 24). Mounted on shaft 61 are two loose sleeves 108, 109, each of which extends over one-half of the shaft 61 and is flanged at its inner end, so that the two flanges come together. On the sleeve 108 is a sleeve 110, over which pass the belts G', G². On the sleeve 109 is a similar sleeve 111, over which pass the belts H', H². Outward sliding movement of the sleeves 110, 111 is prevented by fixed collars 112. Immediately adjacent to the inner ends of the sleeves 110, 111 are two short sleeves 113, 114, and between these sleeves and the flanges of sleeves 108, 109 are two short sleeves 115, 116, over which pass the belts G, H. The short sleeves 113, 114 carry two narrow belts K, L. The function of these belts K, L is to take the leaf from the stripping mechanism, as already explained, and to deliver it to the booking mechanism. In order to make their operation clear, the construction of the booking mechanism must first be explained.

*The booking mechanism.*—The booking mechanism is mounted in the two side frames J, which are connected together by properly distributed tie-rods. This structure rests upon the main frames 25, and is detachably secured thereto, as already explained, by the lugs 107 and shaft 61, Fig. 24, and also by clamping lugs 117 on each of said side frames, which are clamped to the main frames 25 by the screw studs 118, Figs. 2 and 4. When said studs are loosened and the shaft 61, Fig. 24, is taken out, then the frames J, with the booking mechanism therein, can be removed from the stripping mechanism.

M is the booking drum fast on its shaft which is journaled in the side frames J. Said shaft at one end carries a gear 119, Fig. 1, which engages with a pinion 120, carried on a stud on one of the frames J, Fig. 1, which in turn engages with gear 34. In this way, the booking drum is positively rotated.

The two narrow belts K, L lead as follows: Referring first to Figs. 8 and 24. After passing over the rolls on shaft 61, said belts pass over loose rolls which are on a shaft 121, secured in the side frames J. They then pass under the booking drum M, as shown in Fig. 23, and around the same, and then around loose rolls which are on a shaft 122, Figs. 4, 8, 22, 23, which is secured in between the arms of a swinging bracket N, Figs. 22 and 23, which will be described farther on, and thence over loose rolls on shaft 123, Figs. 1, 22, 23, supported between the side frames J, and thence over flanged tightening rolls 124, Fig. 5, carried by the arms 125, Figs. 1, 2, 5, 6. Arms 125 are loose on fixed shaft 126, which is secured in offsets, Fig. 6, on the frames J. To the arms 125 are connected helical springs 127. The belts K, L then extend downwardly and pass over loose rolls on a shaft 128, thence downwardly and under loose rolls on fixed shaft 129, Figs. 1 and 4, and so back to rolls on shaft 61. It is to be understood that the wing portions of the leaf lie upon the comb-like teeth or fingers 106, Fig. 12, so that as they are moved forward by the belts K, L, they slide over said teeth. In this way, they are carried by the belts K, L to the booking drum, and remain in engagement between said belts and said drum during the booking operation. On the booking drum M are five other belts, O, P, Q, R, S. The belt Q lies between the belts K, L. These belts pass over the loose rolls on shaft 121, thence under the booking drum; thence over the loose rolls on shaft 122; thence over loose rolls on shaft 123, Fig. 1; thence over flanged tightening rolls 130 on arms 131 loose on shaft 126 and provided with helical springs similar to springs 127; thence over loose rolls on shaft 128, thence over rolls on shaft 129; and finally back to the rolls on shaft 121.

*Removal of booked leaves.*—After a sufficient number of the leaves have been booked, in order to remove them from the booking drum M, it is necessary to raise the shaft 122 which is journaled in swinging brackets N. This is accomplished in the following manner (see Figs. 1, 3, 4, 22, 23): Extending through the frames J is a rock shaft 132, Fig. 4, on the right hand end of which, outside of the frame, is secured a lever arm 133, Fig. 1. To the end of this arm is pivoted a link 134. The other end of link 134 is pivoted to a lever 135 carrying a handle, the inner end of which lever is pivoted on a projection 136 on the frame J. Returning now to Fig. 4; on the shaft 132 is secured a lever arm 137, which by means of link 138 is connected to the cross bar of the swinging bracket N. The bracket N has two upwardly extending arms 139, which are bifurcated, as shown at 140, Figs. 22, 23, to receive fixed studs 141 which project from the inner sides of the frames J. The ends of the shaft 122 are received in vertical recesses 142 in blocks 143 which are fast on the inner sides of the frames J. The parts being in the position shown in Fig. 22, the shaft 122 lies in the bottom of recesses 142. To raise the shaft, the handle lever 135 is drawn outward and downward to the position shown in Fig. 23. The first effect is to raise the shaft 122 entirely out of the recesses 142, at the same time bringing the studs 141 out of the straight portions of the slots 140, thus permitting said slots to turn on said studs, so that the bracket N can be brought into the substantially horizontal position shown in Fig. 23. It will be observed that when the bracket N is in closed position it is locked against outward movement both at top and bottom.

In order to lock the shaft 61, we cut a flat bottomed recess in said shaft, as shown at 144, Fig. 24, and engage therewith a longitudinally slotted plate 145, Figs. 2 and 4, secured to one of the frames J.

As here shown, the cam 82 which controls the opening and closing together of the feed rolls A, B is constructed and timed so as to make one revolution while the booking drum M makes one revolution. This insures the registering of the leaves one upon the other on the drum, to form the book. It will, of course, be obvious that we may by any suitable gearing cause the cam 82 to make two, three or more revolutions to the drum's one revolution, and in this way, we can arrange the machine for leaves of short length to produce two or more books successively around the drum circumference.

On the front of the machine is secured an apron 146, (middle part broken away in Fig. 3) which protects the operator from getting his fingers caught between the feed rolls A, B. A second treadle 147 may be secured to the shaft which carries treadle 30, for convenience in operation.

We claim:

1. A tobacco stripping machine, comprising a rotary cylinder for supporting the leaf to be stripped, means for stretching the leaf laterally on said cylinder, and a cutter coöperating with the cylinder surface to divide the stretched leaf longitudinally on opposite sides of the stem.

2. A tobacco stripping machine, comprising a rotary cylinder for supporting the leaf to be stripped, means for stretching the leaf laterally on said cylinder, a cutter coöperating with the cylinder surface to divide the stretched leaf longitudinally on opposite sides of the stem, and means for regulating the stretching strain.

3. A tobacco stripping machine, comprising a rotary cylinder for supporting the leaf to be stripped and having an encircling rib, a circular cutter coöperating with the circumferential surface of said rib to divide the leaf on opposite sides of the stem, and means for stretching the leaf laterally over said rib.

4. A tobacco stripping machine, comprising a rotary cylinder for supporting the leaf to be stripped and having an encircling rib, a circular cutter coöperating with the circumferential surface of said rib to divide the leaf on opposite sides of the stem, means for stretching the leaf laterally over said rib, and means for regulating the stretching strain.

5. A tobacco stripping machine, comprising a rotary cylinder for supporting the leaf to be stripped and having an encircling rib, belts on said cylinder adapted to engage the wing portions of said leaf on opposite sides of said rib, and a circular cutter coöperating with the circumferential surface of said rib to divide the leaf on opposite sides of the stem.

6. A tobacco stripping machine, comprising a rotary cylinder for supporting the leaf to be stripped and having an encircling rib with a groove adapted to receive the stem, a circular cutter coöperating with the circumferential surface of said rib to divide the leaf on opposite sides of the stem, and means for stretching the leaf laterally outward from the stem.

7. A tobacco stripping machine, comprising a rotary cylinder for supporting the leaf to be stripped and having an encircling rib, belts on said cylinder on opposite sides of said rib, independently supported belts in contact with said cylinder belts and coöperating with the cylinder belts to engage the leaf and feed it forward, and a circular cutter coöperating with the circumferential surface of said rib to divide the leaf on opposite sides of the stem.

8. A tobacco stripping machine, comprising a rotary cylinder for supporting the leaf to be stripped and having an encircling rib, belts on said cylinder on opposite sides of said rib, independently supported belts in contact with said cylinder belts and coöperating with the cylinder belts to engage the leaf and feed it forward, means for varying the tension of said last-named belts, and a circular cutter coöperating with the circumferential surface of said rib to divide the leaf on opposite sides of the stem, 9. A tobacco stripping machine, comprising a rotary cylinder for supporting the leaf to be stripped, means for longitudinally dividing said leaf on opposite sides of the stem, and means for moving said dividing means into and out of coöperation with said cylinder-surface to regulate the length of the cut in said leaf.

10. A tobacco stripping machine, comprising a rotary cylinder for supporting the leaf to be stripped, a circular cutter for longitudinally dividing said leaf on opposite sides of the stem, and means for moving said cutter into and out of coöperation with said cylinder-surface to regulate the length of the cut in said leaf.

11. A tobacco stripping machine, comprising a rotary cylinder for supporting the leaf to be stripped, two independently supported disk cutters for longitudinally dividing said leaf on opposite sides of the stem, and means for moving said cutters into and out of coöperation with said cylinder-surface to regulate the length of the cut in said leaf.

12. A tobacco stripping machine comprising a cylinder for supporting the leaf to be stripped, positively driven means for rotating said cylinder, and a circular cutter for longitudinally dividing said leaf on opposite sides of the stem; the said cutter being rotated by contact with said cylinder-surface.

13. A tobacco stripping machine, comprising a rotary cylinder for supporting the leaf to be stripped, a circular cutter for longitudinally dividing said leaf on opposite sides of the stem, means for moving said cutter into and out of coöperation with said cylinder-surface, and means for adjusting said cutter to vary the position of its point of contact with said cylinder-surface.

14. A tobacco stripping machine, comprising a rotary cylinder for supporting the leaf to be stripped, means for laterally stretching the leaf thereon, means for positively rotating said cylinder, a circular cutter rotated by frictional engagement with said cylinder-surface for longitudinally dividing said leaf on opposite sides of the stem, and means for moving said cutter into and out of coöperation with said cylinder-surface.

15. A tobacco stripping machine, comprising a rotary cylinder for supporting the leaf to be stripped, a rotary cutter for longitudinally dividing said leaf on opposite sides of the stem, pivoted bell-crank levers having arms supporting said cutter, a rotary shaft, and cams on said shaft engaging other arms of said bell-crank levers and operating to move said cutter into and out of coöperation with the surface of said cylinder.

16. A tobacco stripping machine, comprising a rotary cylinder for supporting the leaf to be stripped, a rotary cutter for longitudinally dividing said leaf on opposite sides of the stem, pivoted bell-crank levers having arms supporting said cutter, means for adjusting said cutter in said arms nearer to or farther from the pivot of said lever, a rotary shaft, and cams on said shaft engaging other arms of said bell-crank levers and operating to move said cutter into and out of coöperation with the surface of said cylinder.

17. A tobacco stripping machine, comprising a rotary cutter for longitudinally cutting the leaf on opposite sides of the stem for a predetermined distance, and means for transversely dividing the stem to free the same from the leaf at the end of the longitudinal cuts.

18. A tobacco stripping machine, comprising a rotary cutter for longitudinally cutting the leaf on opposite sides of the stem for a predetermined distance, means for transversely dividing the stem to free the same from the leaf at the end of the longitudinal cuts, and means for ejecting the freed stem from the machine.

19. A tobacco stripping machine, comprising a rotary cylinder receiving the leaf to be stripped, a rotary cutter for longitudinally cutting the leaf on opposite sides of the stem for a portion of the length of said leaf, and means for transversely dividing said cut stem to remove the same from the leaf.

20. A tobacco stripping machine, comprising a support for the leaf to be stripped, means for laterally stretching the leaf while on said support, means for longitudinally cutting the leaf on opposite sides of the stem for a portion of the length of said leaf, and means for transversely dividing said cut stem to remove the same from the leaf.

21. A tobacco stripping machine, comprising means for longitudinally dividing the leaf on opposite sides of the stem, a fixed cutting block, means for transporting the stem in front of said block, a movable knife, and means for moving said knife into coöperation with said block to divide said stem transversely.

22. A tobacco stripping machine, comprising means for longitudinally dividing the leaf on opposite sides of the stem, a fixed cutting block, means for transporting the stem in front of said block, a movable knife, means for moving said knife into coöperation with said block to divide said stem transversely, and means for timing the movement of said knife.

23. A tobacco stripping machine, comprising means for longitudinally dividing the leaf on opposite sides of the stem, a fixed cutting block, means for transporting the stem in front of said block, a movable knife, a rotary shaft, a cam on said shaft, and transmitting mechanism between said cam and said knife for causing said knife to move into coöperation with said block to divide said stem transversely.

24. A tobacco stripping machine, comprising means for longitudinally dividing the leaf on opposite sides of the stem, a fixed cutting block, means for transporting the stem in front of said block, a movable knife, a rotary shaft, a cam on said shaft, a pivoted bell-crank lever having one arm connected to and actuating said knife, a retracting spring connected to said lever, a roller on the other arm of said lever bearing on said cam, a guide plate on said cam, a dog on one face of said lever roller arm outside of said roller and bearing on the periphery of said guide plate; the said parts being constructed and arranged so that after said roller leaves said cam, said dog shall run off the end of said plate.

25. A tobacco stripping machine, comprising two feed rolls engaging the leaf to be stripped, stripping mechanism receiving the leaf from said rolls, automatic means for separating said rolls at predetermined intervals of time and a cutting mechanism for dividing said leaf longitudinally on opposite sides of the stem.

26. A tobacco stripping machine, comprising two feed rolls engaging the leaf to be stripped, stripping mechanism receiving the leaf from said rolls, automatic means for separating said rolls at predetermined intervals of time, means for varying said time intervals and means for cutting a predetermined length of the leaf from the stem.

27. A tobacco stripping machine, comprising a rotary cylinder receiving the leaf to be stripped, a shaft therefor, a bracket loosely mounted on said shaft, an upper feed roll journaled in arms of said bracket and extending in front of said cylinder, a lower feed roll, means for vibrating said bracket to separate said upper feed roll from said lower feed roll at predetermined intervals of time, and means for cutting a predetermined length of the leaf from the stem.

28. A tobacco stripping machine, comprising a swinging bracket, an upper feed roll journaled in said bracket, a lower feed roll, a rotary shaft, a cam on said shaft, mechanism interposed between said cam and said bracket for vibrating said bracket to raise said upper feed roll at predetermined intervals of time, and means for cutting a predetermined length of the leaf from the stem.

29. A tobacco stripping machine, comprising a feeding device for the leaf, means for cutting a predetermined length of the leaf from the stem, means for causing the feeding device to operate during predetermined intervals of time, and means for timing the relative action of said means for operating said feeding device and said cutting means.

30. A tobacco stripping machine, comprising a rotary cylinder receiving the leaf to be stripped, two feed rolls, one above the other, disposed in front of said cylinder, endless belts passing over said rolls and below said cylinder, the upper belt being in contact with said cylinder and the lower belt in contact with the upper belt, means for driving said belts to draw the leaf between them and convey the same under said cylinder, and means coöperating with said cylinder-surface for longitudinally dividing said leaf on opposite sides of said stem.

31. A tobacco stripping machine, comprising a rotary cylinder receiving the leaf to be stripped, two feed rolls, one above the other, disposed in front of said cylinder, endless belts passing over said rolls and below said cylinder, the upper belt being in contact with said cylinder and the lower belt in contact with the upper belt, means for driving said belts to draw the leaf between them and convey the same under said cylinder, means coöperating with said cylinder-surface for longitudinally dividing said leaf on opposite sides of said stem, and means for separating said feed rolls at predetermined intervals of time.

32. A tobacco stripping machine feeding device, comprising two feed rolls engaging the leaf to be stripped, two groups of endless belts passing over said rolls, the lower surface of the upper belts being in contact with the upper surface of the lower belts, supporting rolls for said belts, means for driving said belts to engage the leaf between them and feed said leaf into the machine, and means for separating said feed rolls at predetermined intervals of time.

33. A tobacco stripping machine, comprising a driving mechanism, means for cutting the wing portions of the leaf from the whole length of the stem, means for limiting the operation of said means to a portion of the length of the stems, and means for throwing said limiting means into and out of engagement with said driving mechanism.

34. A tobacco stripping machine, comprising a driving gear having a tubular hub and a keyway on the inner periphery of said hub, a tubular shaft actuated by said gear, stripping mechanism for removing the wing portions of the leaf from the stem actuated by said shaft, a second tubular shaft within said first tubular shaft, mechanism for limiting the action of said stripping mechanism to remove said wing portions from a portion of the length of the stem, a rod slidable in said inner tubular shaft, and a key pivoted on the end of said rod, disposed within said hub and adapted to engage in said keyway.

35. A tobacco stripping machine, comprising means for longitudinally dividing the leaf on opposite sides of the stem, means for transversely dividing said cut stem, and means timed and operating after said transverse division for ejecting the wholly separated portion of said stem from said machine.

36. A tobacco stripping machine, comprising means for longitudinally dividing the leaf on opposite sides of the stem, means for transversely dividing said cut stem, and a vibrating finger disposed above said stem and timed and operating after said transverse division to eject the wholly separated portion of said stem from said machine.

37. A tobacco stripping machine, comprising means for longitudinally dividing the leaf on opposite sides of the stem, means for transversely dividing said cut stem, an inclined guide trough below said stem, and a vibrating finger disposed above said stem and timed and operating after said transverse division to eject the wholly separated portion of said stem into said guide trough.

38. A tobacco stripping machine, comprising means for longitudinally dividing the leaf on opposite sides of the stem, a cutting block above said stem, a swinging knife below said stem coöperating with said block transversely to divide said cut stem, a guide trough disposed to receive the free portion of said stem, and an oscillating finger above said stem; the aforesaid parts being constructed and arranged so that upon the operation of said knife, said finger shall engage the free portion of said stem and force the same downwardly into said guide trough.

39. A tobacco stripping machine, comprising a rotary cylinder for supporting the leaf to be stripped, two rotatable cutting disks, independent supports for said disks and means for actuating said supports to move said disks into and out of coöperation with the surface of said cylinder to cut a predetermined length of the leaf from the stem.

40. A tobacco stripping machine, comprising a rotary cylinder for supporting the leaf to be stripped, a fixed shaft, two two-armed levers loose on said shaft, retracting springs for said levers, a fixed shaft on each member of one pair of said arms, cutting disks loose on said shafts, disposed face to face and separated by a predetermined interval, rollers on each member of the other pair of said arms, a rotary shaft, and cams on said rotary shaft coöperating with said rollers to vibrate said two-armed levers and move said disks out of coöperation with the surface of said cylinder.

41. A tobacco stripping machine, comprising a rotary cylinder having an encircling rib, means for retaining said leaf on said cylinder and rib, and two independently supported rotatable cutting disks coöperating with the circumferential surface of said rib to produce parallel longitudinal cuts in said leaf.

42. A leaf-supporting cylinder for tobacco stripping machines, comprising a rotary shaft, a fixed collar thereon having an encircling rib, and two sleeves on said shaft respectively overlapping the circumferential periphery of said collar on opposite sides of said rib.

43. A tobacco stripping and booking machine, comprising means for separating the stem from the wing portions of the leaf, an upper group of belts, a lower group of belts, the under surfaces of the belts of the upper group being in contact with the upper surfaces of the belts of the lower group, means for driving said belts, the said wing portions being engaged between said contacting belt surfaces, a rotary booking drum, means for conveying said wing portions from said belts to said drum, and means for retaining said wing portions upon said drum.

44. A tobacco stripping and booking machine, comprising means for separating the stem from the wing portions of the leaf, an upper group of belts, a lower group of belts, the under surfaces of the belts of the upper group being in contact with the upper surfaces of the belts of the lower group, means for driving said belts, the said wing portions being engaged between said contacting belt surfaces, a rotary booking drum, belts in contact with said drum and receiving said wing portions from said groups of belts, and means for driving said drum belts to convey said wing portions to and retain the same upon said drum.

45. A tobacco stripping and booking machine, comprising a rotary booking drum, belts for retaining leaves in contact with said drum, supports for said belts, stripping means, belts for conveying the stripped leaves to the booking mechanism, means for driving said belts, and rolls for supporting said belts; two of said drum belts passing around one of the rolls supporting said conveying belts and operating to carry the stripped leaf from said conveying belts to said drum surface.

46. A tobacco booking machine, comprising side frames, a rotary booking drum, an upwardly and outwardly swinging bracket pivoted between said frames, a roll journaled in said bracket, rolls interposed between said frames, belts in contact with said drum and passing over said frame and bracket rolls, means for locking said bracket when in lowered position, compelling first raising of the bracket before the same can be swung outwardly and upwardly to release said bracket.

47. A tobacco booking machine, comprising a normally continuously rotating booking drum, means for feeding the leaves to said drum, and means for intermitting the operation of said feeding means at predetermined intervals of time to cause the leaves to be superimposed in registry on said drum.

In testimony whereof we have affixed our signatures in presence of two witnesses.

GRAHAM H. JACKSON.
CHARLES P. DAY.

Witnesses:
 GERTRUDE T. PORTER,
 MAY T. McGARRY.